United States Patent [19]

Brown

[11] 4,241,954
[45] Dec. 30, 1980

[54] WHEEL COVER RETENTION ARRANGEMENT

[75] Inventor: Trevor J. Brown, Rochester, Mich.

[73] Assignee: General Motors Corporation, Detroit, Mich.

[21] Appl. No.: 84,512

[22] Filed: Oct. 12, 1979

[51] Int. Cl.³ .............................................. B60B 7/00
[52] U.S. Cl. .................................. 301/37 R; 220/321; 292/256.69
[58] Field of Search .............. 301/37 R, 37 ST, 37 P, 301/37 TP, 37 PB, 108 R, 108 SA; 292/256.69; 220/319-321

[56] References Cited

U.S. PATENT DOCUMENTS

| 3,480,329 | 11/1969 | Foster et al. | 301/37 R |
| 3,512,840 | 5/1970 | Foster et al. | 301/37 R |
| 3,532,385 | 10/1970 | Foster et al. | 301/37 R |
| 3,663,064 | 5/1972 | McCarroll | 301/37 P |
| 4,027,919 | 6/1977 | Foster et al. | 301/37 TP |

Primary Examiner—H. Grant Skaggs
Attorney, Agent, or Firm—Herbert Furman

[57] ABSTRACT

A wheel cover is retained on a vehicle wheel by a pair of semi-annular shoes which are located inwardly of an axial flange of the wheel cover and engage both this flange and the wheel to floatingly retain the cover on the wheel.

4 Claims, 3 Drawing Figures

WHEEL COVER RETENTION ARRANGEMENT

This invention relates generally to wheel covers and more particularly to an improved wheel cover retention arrangement which floats the cover on the wheel.

The prior art includes various types of wheel cover retention arrangements. One such type of arrangement includes various shaped teeth formed integral with the cover retention flange for engagement with various flanges of the wheel, with the integral spring characteristics of the wheel cover flange and teeth retaining the cover on the wheel. Another type of retention arrangement includes various forms of spring clips which are riveted or otherwise secured to the wheel cover for engagement with a wheel flange. A further type of arrangement includes various continuous or semi-continuous annular members which are secured to the cover for engagement with a wheel flange.

The retention arrangement of this invention is of the latter type, and, in its preferred embodiment includes a pair of generally rigid semi-annular shoes which are spaced annularly of each other inwardly of the cover flange for pivotal and sliding movement between engaged and released positions. The shoes include retention teeth which project radially outwardly through openings in the cover flange. When the shoes are in engaged position, the teeth engage the wheel flange simultaneously with engagement of the shoes with the cover flange so that the cover floats on the wheel. One respective end of each shoe is interlocked with the cover flange to mount the shoes on such flange for pivotal and sliding movement to respective limit positions relative thereto. The other respective shoe ends are connected by a biasing spring which biases such other ends apart and biases the one ends together to pivot the shoes inwardly of the cover flange to limit position about their one ends as the one ends slide relatively to the cover flange to limit position to thereby locate the shoes in released position. An overcenter type latch arrangement accessible from the exterior of the cover and movable between latched and released positions interconnects the one ends of the shoes to move the shoes to engaged position. When the latch arrangement is in latched position, it biases the one ends apart with respect to each other against the action of the biasing spring to pivot the shoes radially outwardly of the cover flange as well as slide the shoes relative to such flange from their respective limit positions so that the retention teeth of the shoes engage the wheel flange simultaneously with engagement of the shoes with the cover flange. Some slight radial bending of the cover flange occurs upon the engagement of the shoes with such flange to ensure a rattle-free mounting of the cover on the wheel. When the latch arrangement is in released position, the biasing spring moves the shoes to released position to permit removal of the cover from the wheel.

A primary object of this invention is to provide a wheel cover retention arrangement wherein a pair of rigid annular shoes are mounted on a cover flange for simultaneous engagement with both the cover flange and the wheel to float the cover on the wheel. Another object is to provide such an arrangement wherein the shoes are arranged annularly within the cover flange and each have one respective end thereof interlocked with the cover flange for pivotal and sliding movement relative thereto between engaged and released positions relative to such flange and the wheel. A further object is to provide such an arrangement wherein the shoes are moved between engaged and released positions by a biasing means and a latch arrangement contained within the cover, with the latch arrangement including an operator accessible from outside the cover for moving the latch arrangement between latched and unlatched positions, and with such operator being concealed between the cover and the wheel when the latch arrangement is in latched position.

These and other objects of the invention will be readily apparent from the following specification and drawings wherein.

Figure 1:
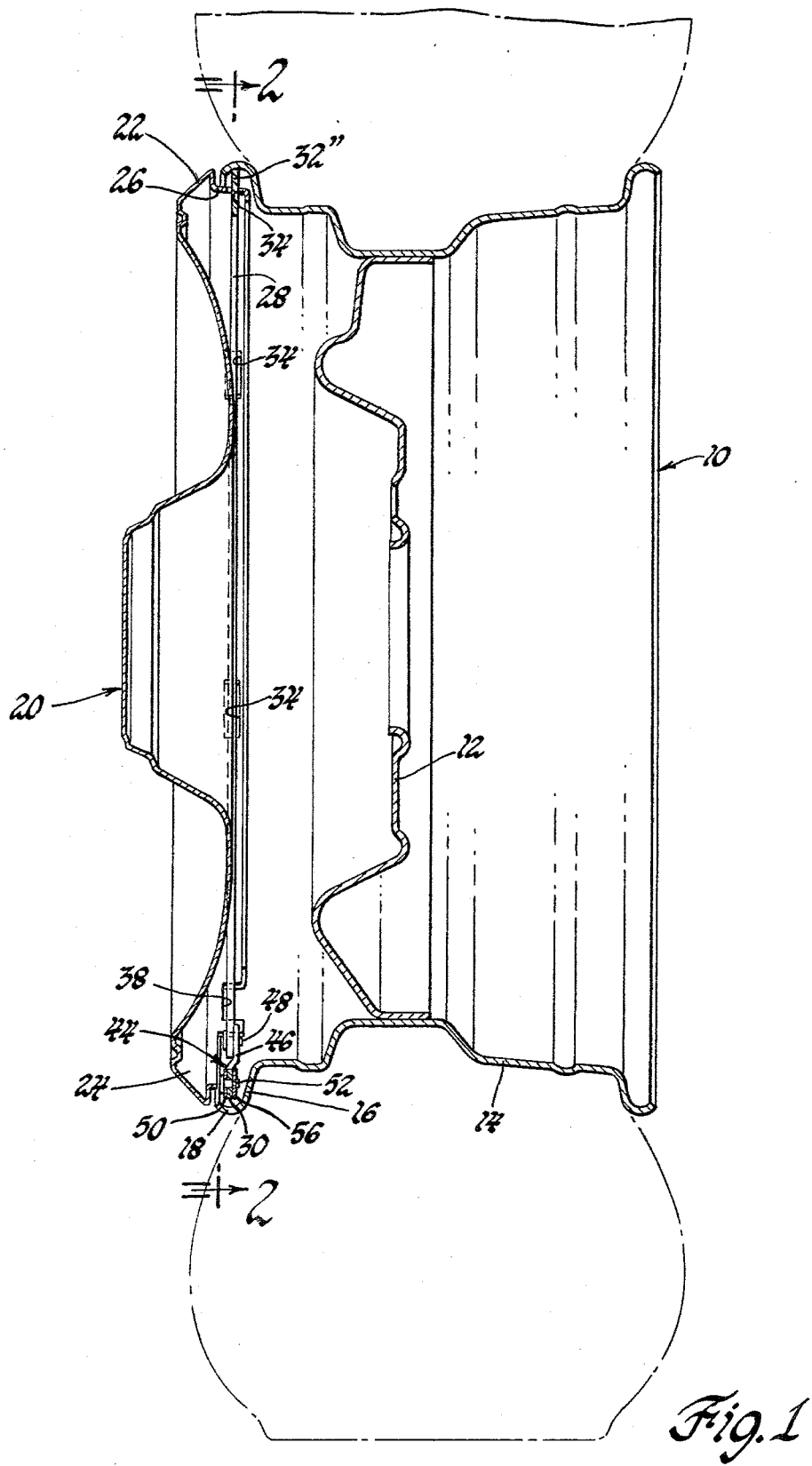
FIG. 1 is a sectional view of a conventional vehicle wheel and tire having a cover mounted thereon by a wheel cover retention arrangement according to this invention.

Referring now to FIG. 1 of the drawings, a conventional vehicle drop center wheel 10 includes a hub 12 which is riveted or otherwise secured in a conventional manner to a conventional drop center type wheel rim 14. The rim 14 includes an axially facing radially extending first wheel flange 16 which merges into a radially facing axially extending second or terminal wheel flange 18. The wheel 14 forms no part of this invention and no further description is therefore believed necessary.

A wheel cover 20 includes an outer peripheral portion 22 having an integral radially extending axially facing cover flange 24 which is juxtaposed to the wheel flange 16 and merges into an integral axially extending radially facing segmented cover flange 26 juxtaposed to wheel flange 18. Although the flanges 24 and 26 are shown integral with the cover 20, they may be formed separately as part of a retention band secured to a cover body in a known manner.

Figure 2:
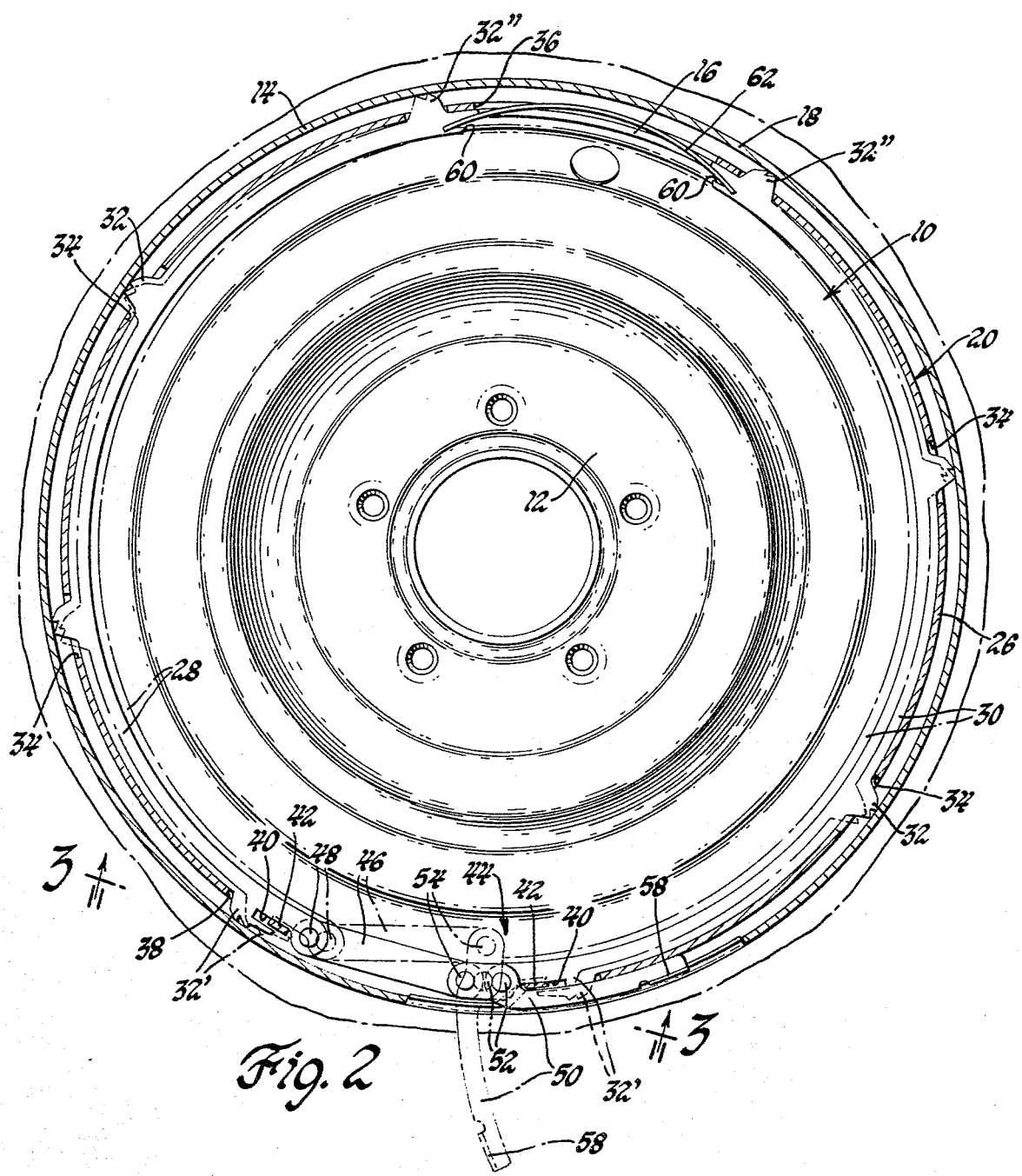
FIG. 2 is a sectional view taken generally along the plane indicated by line 2—2 of FIG. 1 and showing the retention arrangement in full lines in engaged position and in dash lines in released position.

In accordance with this invention, a cover retention arrangement includes a pair of rigid semi-annular shoes 28 and 30, FIG. 2, formed concentrically about the cover axis. The shoes 28 and 30 are symmetrical with respect to each other but are arranged asymetrical within the cover flange 26. Each shoe includes a plurality of radially extending cover retention teeth 32 formed integral therewith. The teeth 32 of one shoe face circumferentially oppositely of the teeth of the other shoe due to the asymetric arrangement of the shoes 28 and 30 to thereby provide an anti-rotation feature when the shoes are in engaged position as will be further described. The flange 26 is provided with a number of slots 34 to permit movement of a like number of teeth 32 radially inwardly and outwardly with respect to the flange as the shoes move between respective released and engaged positions. The flange 26 is further provided with a diametrically opposite pair of elongated slots 36 and 38 to permit radial movement of the teeth 32' and 32" at one end and the other end respectively of the shoes with respect to the flange.

The shoes 28 and 30 are slotted at 40 at the one ends thereof to receive a strap portion 42 of flange 26 and thereby pivotally and slidably mount the shoes on the flange for movement between engaged and released positions as will be described. A latch arrangement, FIG. 3, designated generally 44 interconnects the one ends of the shoes. The latch arrangement 44 includes a link 46 pivoted at one end thereof at 48 to the shoe 28 adjacent the slot 40 thereof. An arcuate operator 50 is pivoted at 52 to the shoe 30 generally adjacent the slot 40 thereof and also pivoted at 54 to the link 46. The pivots 52 and 54 are provided by rivets and a backup plate 56 reinforces the pivots. The operator 50 is formed of thin sheet metal stock as evident from FIG. 3 and moves radially inwardly and outwardly relative to the cover flange 24. The operator includes an arcuate lateral terminal flange or finger engageable portion 58 accessible from the exterior of the cover. The flange 58 extends axially outwardly over the peripheral area 22 of the cover. Due to the thinness of the material, the flange is not readily visible from the exterior of the cover and does not detract from the appearance of the cover when the cover is mounted on the wheel. The other ends of the shoes 28 and 30 are slotted at 60 to receive the slotted ends of a bowed flat steel spring 62.

Figure 3:
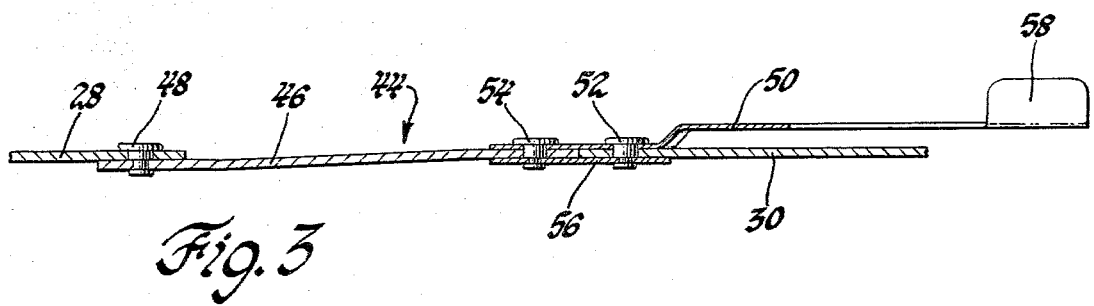
FIG. 3 is an enlarged sectional view taken generally along the plane indicated by line 3—3 of FIG. 2.

When the latch arrangement 44 is in latched position as shown in FIG. 2, the pivot 54 is overcenter with respect to the pivots 48 and 52 and maintained in this position by spring 62. The curved operator 50 is located axially inwardly of the flange 24 in engagement with the flange 26 and is therefore not visible. The flange 58 of the operator projects outwardly over the peripheral portion 22 but is not readily visible from the exterior of the cover since it is thin and follows the curvature of portion 22. The shoe 30 engages one end of the link 46 as shown in FIG. 3 to provide a positive connection between the one ends of the shoes 28 and 30. The biasing action of the spring 62 pivots the shoes 28 and 30 radially outwardly of the flange 26 about the pivotal connection therebetween provided by strap portions 42 and slots 40 to engage the teeth 32 with the wheel flange 18 and retain the cover on the wheel. The heighth of the teeth 32 is set such that the shoes 28 and 30 engage the flange 26 intermediately of the openings 34, 36 and 38 therethrough simultaneously with biting engagement of the teeth with flange 18. This slightly radially outwardly bends the segmented flange and ensures a rattle free engagement of the shoes and flange 26 as well as providing for floating of the cover on the wheel.

When it is desired to remove the cover, the flange 58 is manually grasped from the exterior of the cover and the operator 50 rotated radially outwardly from behind the flange 24 to move the latch arrangement to released position shown in dash lines. This moves the pivot 54 to its dash line positions shown in FIG. 2 out of overcenter relationship to the pivots 48 and 52. The spring 62 then biases the shoes 28 and 30 to their dash line released positions so move the teeth 32 of the shoes out of engagement with the wheel flange 18 and permit removal of the cover. In the released position of the shoes, the closed ends of the slots 40 of the shoes engage the strap portions 42 of the flange 26 to limit sliding movement of the shoes relative to flange 26 while the radially outer edges of the slots engage the strap portions to limit pivotal movement of the shoes relative the flange. In effect, the shoes slide and pivot radially inwardly about the strap portions as the shoes move to released position and slide and pivot radially outwardly about the strap portion as the shoes move to engaged position.

Thus this invention provides an improved wheel cover retention arrangement.

The embodiments of the invention in which an exclusive property or privilege is claimed are defined as follows:

1. In combination with a vehicle wheel including an axially outwardly facing radially extending intermediate first annular flange merging into an axially extending radially inwardly facing second terminal flange, a wheel cover covering said wheel and having an outer annular peripheral portion including a radially extending axially inwardly facing first annular flange juxtaposed to the first wheel flange and merging into an axially extending radially outwardly facing second terminal flange juxtaposed to the second wheel flange, a pair of generally rigid semi-annular shoes, each including a plurality of wheel engaging projections, means mounting the shoes on the cover for movement between a first released position spaced radially of the second cover flange wherein the projections are out of engagement with the second wheel flange, and a second mounted position wherein the shoes radially engage the second cover flange and the projections engage the second wheel flange to float the cover on the wheel, means commonly biasing the shoes to the first released position, and means accessible from the outside of the cover peripheral portion for commonly moving the shoes to the second mounted position.

2. In combination with a vehicle wheel including an axially outwardly facing radially extending intermediate first annular flange merging into an axially extending radially inwardly facing second terminal flange, a wheel cover covering said wheel and having an outer annular peripheral portion including a radially extending axially inwardly facing first annular flange juxtaposed to the first wheel flange and merging into an axially extending radially outwardly facing second terminal flange juxtaposed to the second wheel flange, a pair of generally rigid semi-annular shoes, each including a plurality of wheel engaging projections, means mounting one end of each shoe on the second cover flange for bodily movement between a first released position spaced radially of the second cover flange and a second mounted position wherein the shoes radially engage the second cover flange and the projections engage the second wheel flange to float the cover on the wheel, resilient means interconnecting the other ends of the shoes and commonly biasing the shoes to the first released position, and means accessible from the outside of the cover peripheral portion and operatively connected to the one ends of the shoes for moving the shoes to the second engaged position against the action of the resilient means.

3. In combination with a vehicle wheel including an axially outwardly facing radially extending intermediate first annular flange merging into an axially extending radially inwardly facing second terminal flange, a wheel cover covering said wheel and having an outer annular peripheral portion including a radially extending axially inwardly facing first annular flange juxtaposed to the first wheel flange and merging into an axially extending radially outwardly facing second terminal flange juxtaposed to the second wheel flange, a pair of generally rigid semi-annular shoes spaced annularly of each other, each including a plurality of wheel engaging teeth, means pivotally and slidably mounting adjacent one ends of the shoes on the second cover flange for movement radially inwardly relative to the second cover flange to a first released position wherein the teeth of the shoes are out of engagement with the second wheel flange, and movement radially outwardly to a second mounted position wherein the shoes engage the cover flange and the teeth engage the second wheel flange to float the cover on the wheel, resilient means commonly interconnecting the other adjacent ends of the shoes and biasing the shoes to the first released position about their one ends, and means accessible from the outside of the cover peripheral portion and interconnecting the one adjacent shoes ends for moving the shoes to the second mounted position against the action of the resilient means, certain of the wheel engaging teeth being angled in one annular direction and others being angled in an opposite annular direction to prevent rotation of the cover relative to the wheel.

4. In combination with a vehicle wheel including an axially outwardly facing radially extending intermediate first annular flange merging into an axially extending radially inwardly facing second terminal flange, a wheel cover covering said wheel and having an outer annular peripheral portion including a radially extending axially inwardly facing first annular flange juxtaposed to the first wheel flange and merging into an axially extending radially outwardly facing second terminal flange juxtaposed to the second wheel flange and including a pair of groups of annularly spaced openings, a pair of generally rigid annular shoes, each respective to one group of openings and located radially inwardly of the second cover flange, the shoes having their respective pairs of ends spaced annularly adjacent each other, each shoe including a plurality of radially extending projections movable within respective openings in the second cover flange and engageable with the second wheel flange upon engagement of a respective shoe with the second cover flange intermediate the openings, means pivotally and slidably interconnecting each of one respective pair of adjacent shoe ends and the second cover flange and permitting limited annular and radial movement of the shoes with respect to the second cover flange, resilient means interconnecting the other respective pair of adjacent ends of the shoes and biasing said other pair of ends annularly apart and said one pair of ends annularly together with respect to the second cover flange, and means accessible from the outside of the cover peripheral portion and interconnecting the one respective pair of adjacent shoe ends for moving said one pair of ends annularly apart and said other pair of ends annularly together against the action of the resilient means to move said shoes radially outwardly of the second cover flange and engage the projections thereof with the second wheel flange, the engagement of the shoes with the second cover flange intermediate the openings floating the cover on the wheel.

* * * * *